United States Patent Office 2,890,764
Patented June 16, 1959

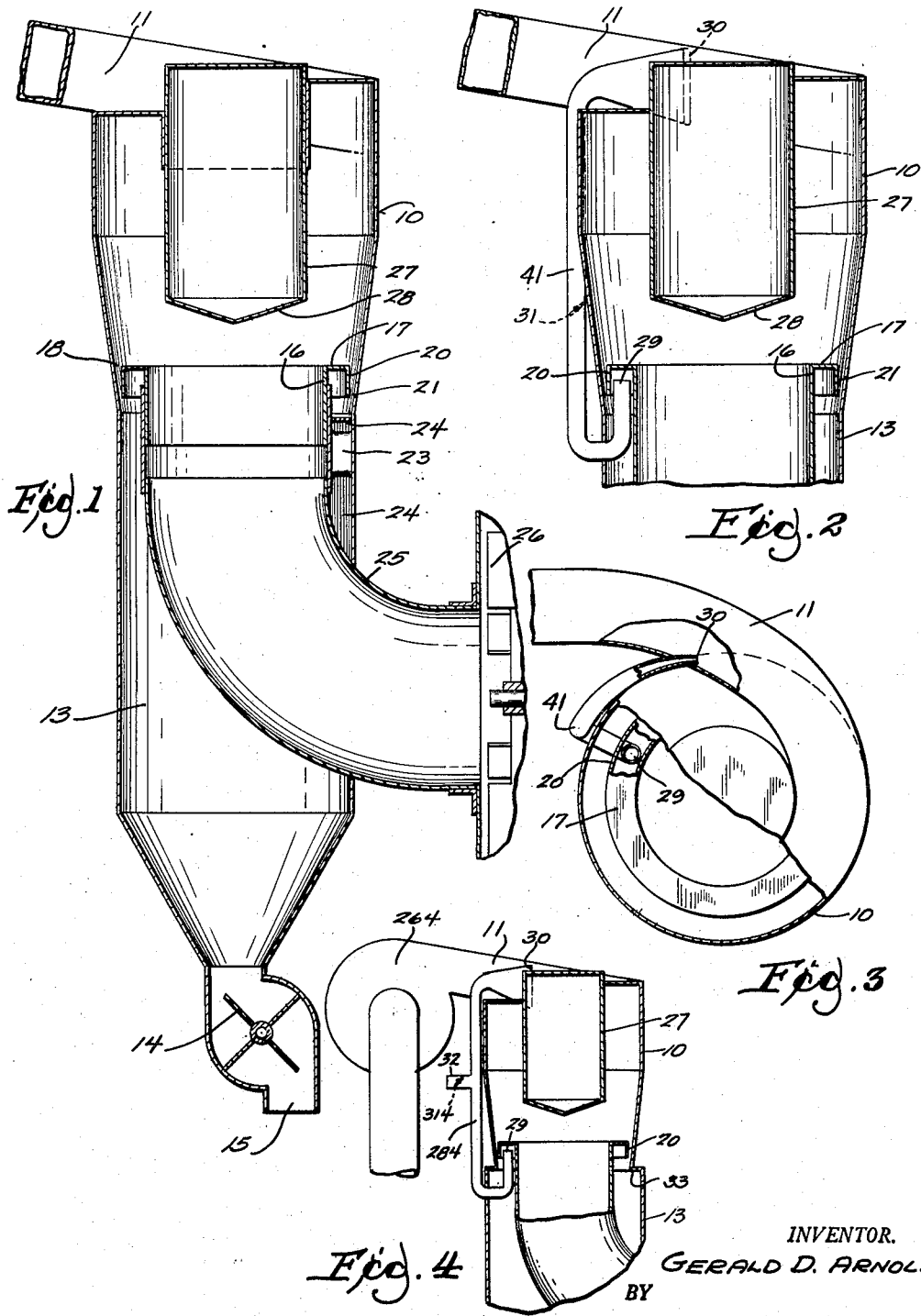

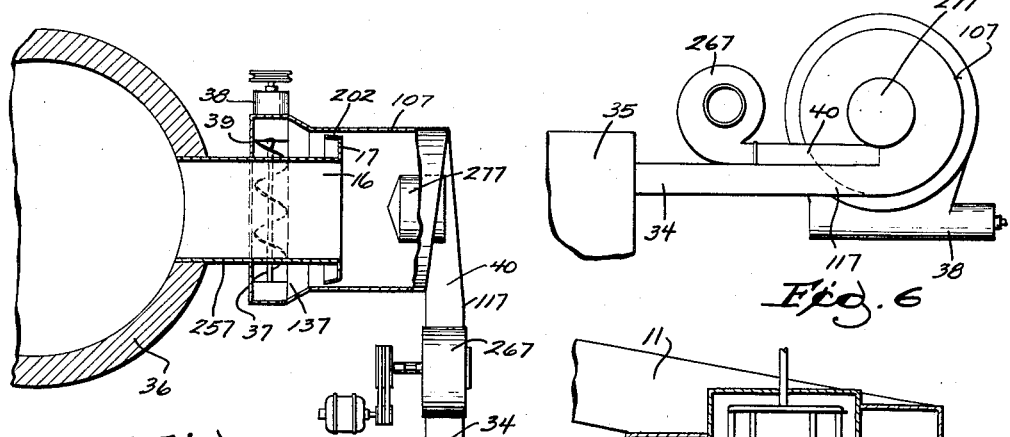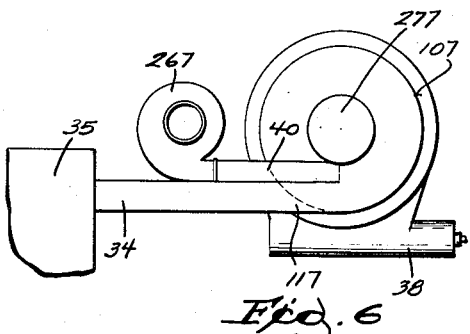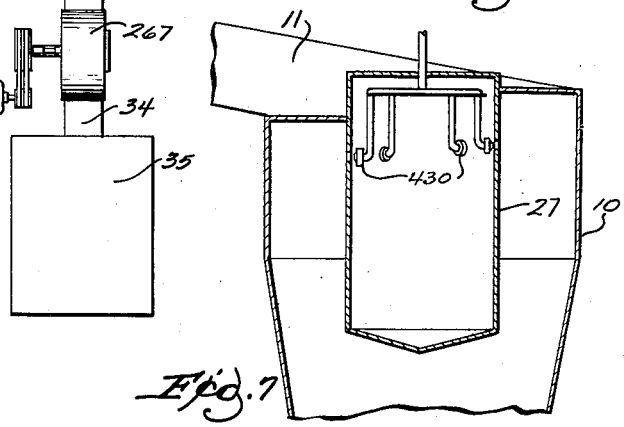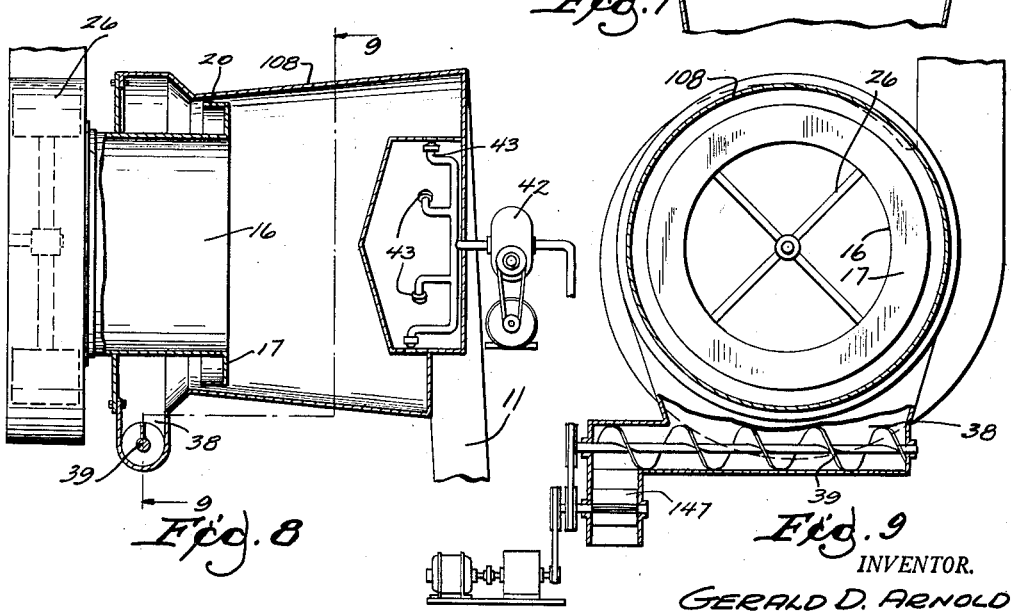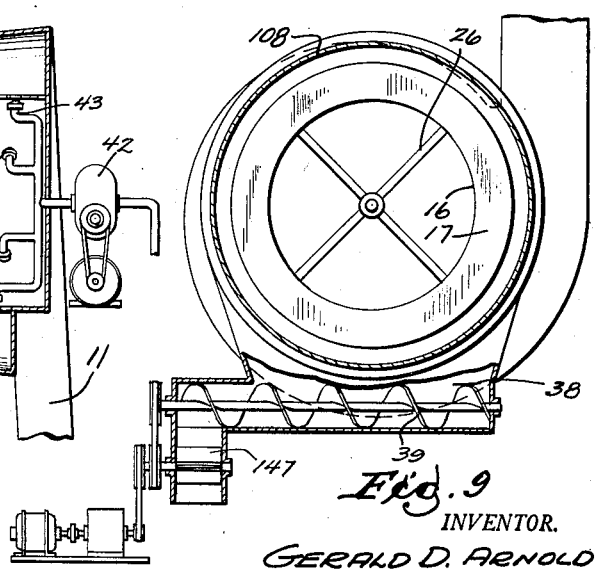

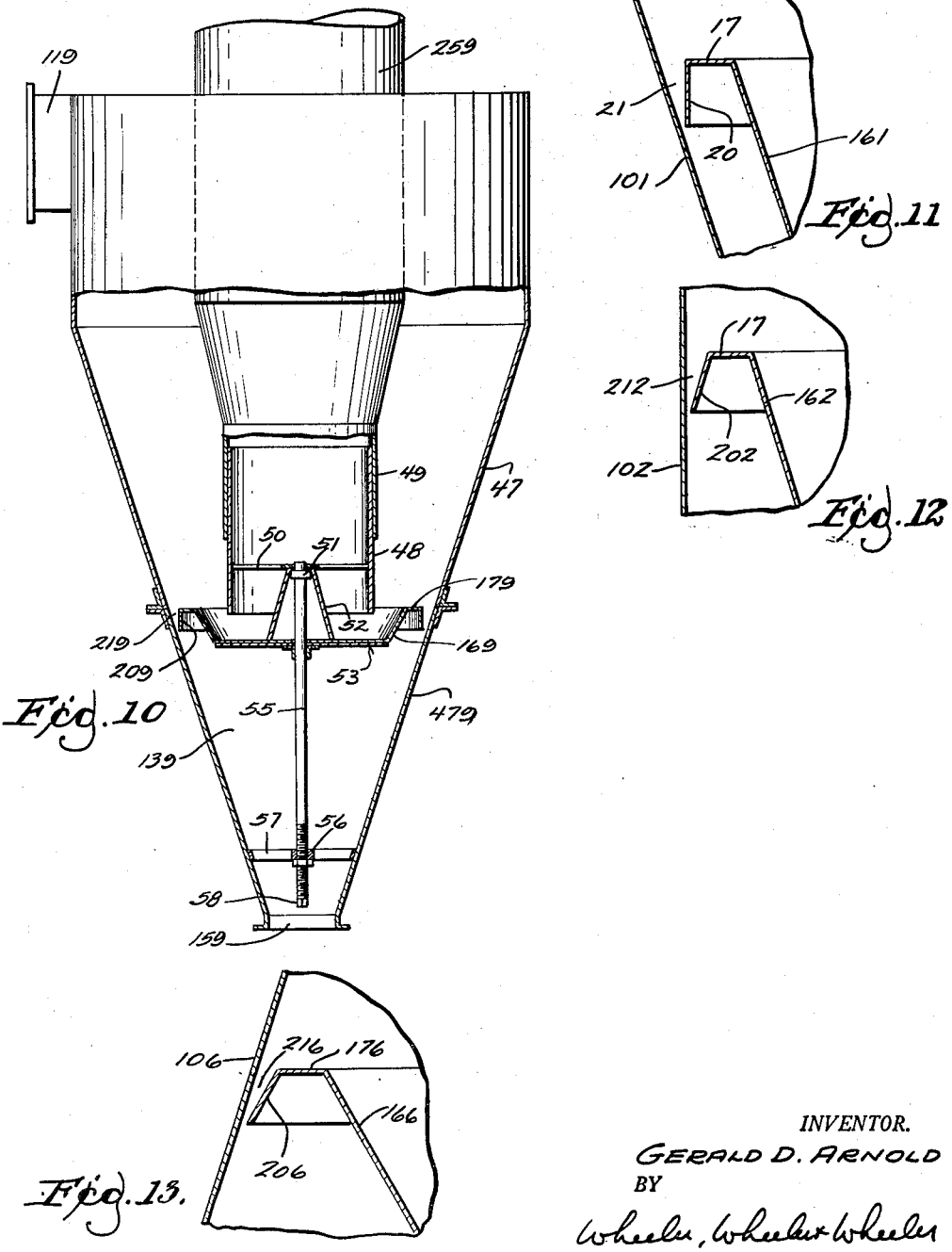

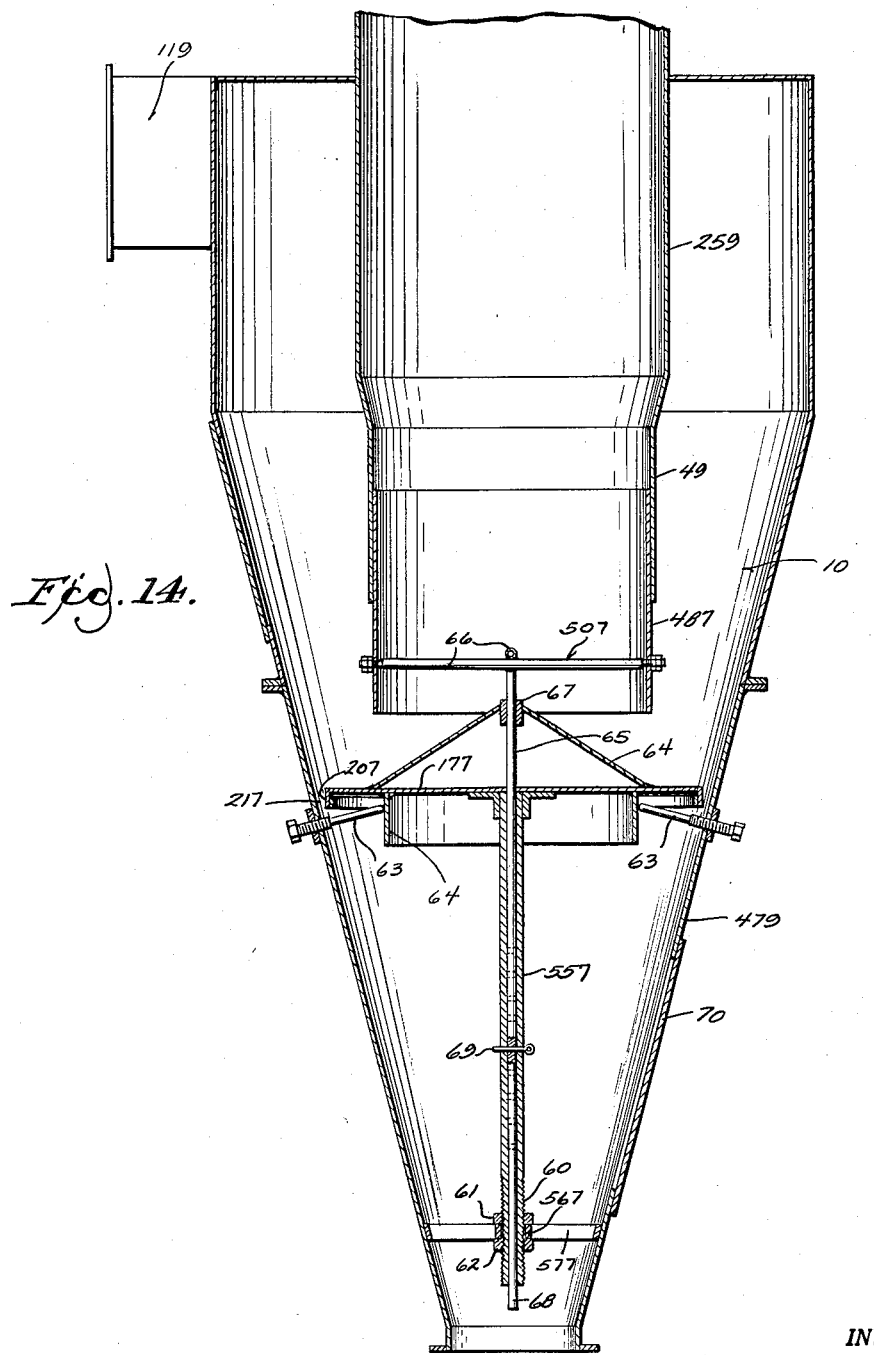

2,890,764

METHOD AND APPARATUS FOR CENTRIFUGAL SEPARATION WITH UNI-DIRECTIONAL FLOW AT THE POINT OF SEPARATION

Gerald D. Arnold, Wauwatosa, Wis.

Application December 7, 1953, Serial No. 396,569

6 Claims. (Cl. 183—83)

This invention relates to a method and apparatus for centrifugal separation with uni-directional flow at the point of separation.

In commercial dust collectors and other separators of the centrifugal type, there is a tangential inlet into a separating chamber having a sump from which solids are removed, and an axial central upward air outlet at the end of the separator opposite from the sump. Where the pneumatically borne material is extremely fine, as in the case of powdered milk, powdered egg, or other dust-like material, there has been at least approximately two to five percent of the material which has escaped with the exhaust current of convection gas discharged from the separator. In the case of expensive products, this represents a very substantial loss of value.

There have been many previous attempts to solve the problem by reducing the angular velocity of the whirling gases at the point where they leave the centrifugally separated material and turn toward the outlet. Rectifying vanes have been used at this point and there have also been attempts to produce a reverse vortex in the outlet which will neutralize the vortex within the separator at the point of separation. None of these attempts have been very successful.

The present invention reduces losses far below previous figures by segregation of entrained material from the convection current without permitting re-entrainment. I have discovered that if the conveyed material is exposed to convection currents at the time the current is changing its axial direction, it is inevitable that some portion of the centrifugally separated material will be re-entrained. In the ordinary separator, in which the whirling gases of the convection current are required to be discharged through a central outlet which is much smaller than the separator chamber itself, there is a tendency to accelerate the angular velocity of the vortex at the point where it changes direction, thus actually increasing its capacity for re-entraining material supposed to be separated therefrom. In effect, the conventional separator establishes a tornado, the whirling spout of which is constantly withdrawing from the previously separated material in the collecting chamber at least a small increment of such material.

By discharging the whirling fluids in the same axial direction in which they are moving at the point of separation, or by segregating the separated material before it can be exposed to any vortex resulting in a change in axial direction of the whirling convection current, I am able to discharge the convection current fluid nearly free of conveyed material and to retain nearly all such material. It is further desired to emphasize that while I have referred particularly to gases and solids, I have done so merely because these ordinarily present the most difficult problems. The method and apparatus herein disclosed may also be used for separating solids from liquids and liquids from gases. It is adapted to any problem of separation from a convection current.

The separating chamber of circular cross section may be cylindrical, or may have a conical wall progressively reducing in cross section, or a conical wall of which the sides are divergent. In any case, I use an annular baffle having its top margin in fairly close proximity to the wall. As pointed out hereafter, the crevice between the baffle and the wall must be so narrow as to skim off the conveyed material with only that component of the convection current which unavoidably remains therewith after most of the fluid of such current has been separated. In the drawings the baffle margin is shown as having a radius approximating six sevenths of that of the contiguous wall portion of the separating chamber. For entrained particles which are extremely fine and light, this margin should not only have a broad upper surface but should have a skirt, the free edge of which approaches even more closely to the wall, defining therewith an annular crevice of wedge shaped cross section.

In embodiments of the invention constituting attachments applicable to conventional separators, the convection current may reverse its axial direction to pass outwardly through the conventional outlet at the top of the separator, but I still am able to achieve nearly complete separation while the convection current and the conveyed material are still moving in the same axial direction, and I segregate the conveyed material from the convection current prior to any change in direction of the latter and prevent any exposure of the segregated material to the outlet vortex of the convection current.

In separators embodying the present invention, it becomes extremely important to eliminate back pressure. Whether the convection current is established by blowing gas into the separator or whether it is established by withdrawing gas from the outlet of the separator, in either case it is desirable that the outlet be of relatively large cross section for a distance far beyond the point at which separation occurs, and desirably to the point of discharge.

In the drawings:

Fig. 1 is a view in vertical axial section through a separator embodying my invention.

Fig. 2 is a fragmentary view of a modified embodiment shown in axial section.

Fig. 3 is a plan view of the embodiment of Fig. 2 with portions broken away.

Fig. 4 is a view similar to Fig. 2 fragmentarily illustrating a further modification.

Fig. 5 is a plan view of an embodiment used for fly ash collection, portions being broken away.

Fig. 6 is a view in side elevation of the device of Fig. 5.

Fig. 7 is a view taken in axial section of an embodiment used for air washing.

Fig. 8 is a view taken in axial section through an embodiment used for spray drying.

Fig. 9 is a view taken in section on the line 9—9 of Fig. 8.

Fig. 10 is a view taken in section through a conventional cyclone separator modified by the incorporation of an attachment causing it to function in accordance with the principles of the present invention.

Figs. 11 through 13, inclusive, are views diagrammatically illustrating different relationships of separating funnel and chamber wall.

Fig. 14 is a view similar to Fig. 10 showing a further embodiment representing an attachment applicable to a conventional cyclone separator.

The fluid convection current and entrained material enters the separating chamber 10 through the tangential pipe 11 in the usual manner. The lower portion 13 of the device serves as a collecting hopper for the material separated from the convection current. This material may be continuously discharged in a known manner through pockets in the rotary valve 14 which pass the material to the discharge spout 15 without permitting atmospheric air to enter or leave the chamber 13 in any substantial quantities.

The convection current and entrained material whirling in the separating chamber 10 as a result of its tangential injection into such chamber advances axially toward an annular partition or baffle 16, the peripheral flange 17 of which desirably extends very close to the wall of the chamber to leave an annular slot at 18 through which the material separated from the convection current can pass to the point of discharge. In preferred embodiments of the invention, a skirt 20 depends from the margin of flange 17 and relatively approaches the wall of the chamber to form, with such wall an annular crevice 21 of wedge shaped cross section. In practice, this crevice may, for ordinary fine particles, be approximately one eighth to three sixteenth inches in its outlet cross section as compared with about three eighths inch, more or less (depending on the relative angles of the wall and the flange) at its inlet cross section.

Where the wall of the separating chamber 10 is conical of progressively decreasing cross section, as shown at 101 in Fig. 11, the skirt 20 may be substantially cylindrical. Where the wall 102 is substantially cylindrical, as in Fig. 12, the skirt 202 may flare so that the annular crevice 212 still has a wedge shape in cross section. If the wall 106 of the separating chamber is conical, progressively increasing in diameter, as shown in Fig. 16, the skirt 206 has increased flare leaving the annular crevice 216 still of wedge shaped cross section. In this device the width of annular flange 176 is reduced as compared with the flange shown in Figs. 1, 11, and 12.

Regardless of the particular construction employed, it will be understood that centrifugal force will urge the relatively heavier material against the wall of the chamber with a radially thin component of the fluid convection current separated centrifugally from the major component of such current almost immediately when the whirling movement of the gases commences as the convection current enters the chamber tangentially. The separated material and gases will progress axially of the chamber (whether the chamber be vertical or horizontal) with continued whirling movement, the relatively lighter major component of the fluid convection current being on the inside and the heavier convected material being spread in a thin whirling layer in immediate contact with the chamber wall. As soon as this condition is achieved, which will usually be very close to the admission point, I segregate the convected material from the major portion of the convection current by withdrawing the latter, leaving the convected material to pass through an annular opening into the dead air space in the sump 13.

In order that the annular opening 21 may be completely unobstructed to cause no eddies at the point where the segregation of the material from the current is completed, I may use a bracket at 23 to support the collector baffle from the wall of the chamber. Some sort of fairing 24 is desirable to prevent separated material from lodging on top of convection discharge pipe 25 and I simply make use of it to house the bracket.

It is broadly immaterial how the convection current is established or set in motion. For many purposes, I prefer to have a blower 26 located at the point at which the convection current leaves the separating chamber to suck the current through the chamber rather than to drive it therethrough. A blower located on the discharge side of the separator maintains the interior of the separator at sub-atmospheric pressure rather than super-atmospheric pressure, and this may be an advantage under certain circumstances as when the separator is also used as a drier and the sub-atmospheric pressure assists in the extraction of water vapor from the material to be dried.

There are many materials which are severely damaged by passing through a blower. For example, dried hops become extremely fragile when they are dehydrated and are practically reduced to dust if they have to pass through a blower. By locating the blower at the outlet, whereby the requisite pressure differential is established by withdrawing convection current gases, I achieve separation of the fragile dried leaves without subjecting them to the impact of the vanes of the fan.

It will be noted that a completely closed cylindrical baffle 27 with a completely closed and desirably conical lower end 28 is used within the separating chamber. This tends to reduce or eliminate any eddy currents within the chamber by holding the convection current in close proximity to the wall of the chamber until the point of separation is reached adjacent the mouth of the current collecting baffle 16.

If the design of the separator is entirely correct, it will function without adjustment or balancing. However, it is easily possible to provide for adjustment by making the annular collecting baffle 16 cylindrical and telescopically adjustable within the upper end of the discharge pipe 25, as shown in Fig. 1, whereby the overall width of the annular crevice 21 may be varied as desired by shifting the baffle with respect to the tapering wall of the separating chamber 10.

If there is any tendency for any of the convection current fluids to pass into the dead air space within the sump 13, pressure balancing may be achieved by a pressure-balancing duct 41 which, as shown in Figs. 2 and 4, has one end 29 opening from a point within the skirt 20 and its other end 30 opening into the inner side of the volute inlet pipe 11 at or before its point of tangency with chamber 10, as shown in Fig. 3. The convection current entering through pipe 11 has a strong aspirating effect tending to return into the convection current gases received from the sump 13, in which it is desired that the air be maintained as quiescent as possible. A damper 31 in this pipe enables accurate control of the amount of gases withdrawn from the sump and makes it possible to balance withdrawals against gases entering the sump, thereby precluding any return of gases through the annular crevice 21 into which the finely divided material must pass. It will be observed that any dust which moves with the returned gases is restored to the convection current and again passes through the separator, instead of being discharged to the atmosphere.

Reference has been made above to the fact that the blower can be either at the inlet or at the outlet. Fig. 4 shows the blower 264 applied to the inlet, where it discharges through pipe 11 into the separating chamber 10. As above stated, this results in the establishment of a super-atmospheric pressure in the separating chamber. In such case, the pressure balancing pipe 284 may have an external vent 32 in which the damper 314 is located. By opening or closing the damper, a greater or lesser amount of atmospheric air is admitted to the balancing pipe 284, thereby enabling control of the pressures in sump 13 with respect to the external or atmospheric pressure.

Fig. 4 incidentally illustrates another feature applicable to any of the embodiments of the invention and comprising a sump 13 which is somewhat larger in diameter than the conical portion of separating chamber 10 to which it is attached. This results in an undercut shoulder at 33, which may be of any desired degree of abruptness, the expansion of the sump further tending to minimize the velocity of any currents therein.

One of the features of the invention lies in the fact that it is unnecessary that the separating chamber have its axis vertical. By way of exemplifying a horizontal separating chamber and, at the same time exemplifying the use of the invention to collect fly ash, I have shown a horizontal chamber 107 in Fig. 5. Its inlet pipe 117 is an extension of the flue 34 of furnace 35. The outlet pipe 257 for discharging gases to the chimney 36 extends axially through the end wall 37 of the sump 137. The latter is provided with a pocket 38 such as that shown in Fig. 9 in which there is a screw conveyor 39 operating to the discharge rotary valve 147. The annular separating baffle or partition 16 is exactly the same as that described in connection with Fig. 1 except that its axis is horizontal. As in the Fig. 1 device, the baffle has a flange 17 approximately at right angles to its axis and there is a skirt 202 which flares because the wall of chamber 107 is cylindrical at the point of separation.

For starting purposes, it is preferred to use a blower 267 having a blast tube 40 tangent to the center baffle 277 so that the blast discharged into the separating chamber aspirates gas from pipe 117 and flue 34 to create a draft within the furnace and the chimney. After the natural draft of the chimney is effective, it may suffice to provide sufficient differential for the operation of the separator.

The separator shown in Fig. 8 has a separating chamber 108 which is also horizontal but is conical at the point of separation. This particular device is not only a separator but a drier which may be used, for example, in reducing skim or whole milk to a powder. One of the reasons why milk powder departs in taste from the liquid material from which it is dehydrated, is the fact that in previous driers it has not been possible to provide for a uniformity of dehydration. Some of the material becomes scorched due to unduly prolonged exposure to heat. In the drier shown in Fig. 8, whether this be horizontal or vertical, the exposure can be controlled with the greatest accuracy by design. Factors affecting exposure are the angular pitch of the conical side of the dehydrating chamber and the axial length thereof, as well as the concentration of the raw material before being discharged under pressure of pump 42 through the nozzles 43 which are directed outwardly into the helical stream of convection current, which is also the dehydrating current, in such a device.

The milk powder, or the like, falls into the sump pit 38 and is discharged by screw 39 through the rotary valve 147, as shown in Fig. 9, and already described. The gases of the dehydrating and convection current, now partially saturated with moisture extracted from the dried material, pass outwardly through the annular separating baffle or partition 16 either to the atmosphere or to the blower and thence to the atmosphere, depending on the location of the blower. In the device illustrated, the blower 26 is directly connected axially with partition 16, it being desirable to produce reduced vapor pressure by having the blower at the outlet, when drying is involved.

In such a device as that shown in Figs. 8 and 9, the liquid to be dehydrated is almost instantly dried to a powder. Its dehydration is completed as it whirls with the convection current of dehydrating gases which, at the same time centrifugally throws the resulting powder to the outside wall of the chamber in the chamber 108, and separation is completed by my improved device as the convection current and the gases still continue to move in the same axial direction toward their respective outlets at opposite sides of the annular partition.

The device shown in Fig. 7 is very similar to that of Figs. 8 and 9 but is preferably vertical, like that of Fig. 1. It differs from Fig. 1 solely in the provision of nozzles 430 which project sprays of water through openings in the central cylinder 27 which moisten entrained dust in the convection current, thereby increasing the weight of the dust and agglomerating the particles to facilitate separation. The resulting moistened dust, and any excess of water, pass outside of the annular baffle partition while the cleaned and washed air continues in the same axial direction past the point of separation.

In its externals, the separator shown in Fig. 10 is conventional, having a tangential inlet 119 and axial upward outlet 259 and a downward central outlet 159 from its conically tapered portion 47. In order that such a separator may be modified simply to take advantage of the principles of the present invention, I have devised an attachment.

The sleeve 48 fits telescopically into the lower end 49 of air discharge pipe 259 and is provided in its lower end with a spider 50. The hub 51 of this spider is connected by bracket 52 with a pan shaped baffle 53 of modified semi-toroidal form.

The exterior wall portion 169 of this baffle will be noted to correspond closely in form and function to the funnel shaped partition baffles above described and shown for example at 16 in Fig. 1; 161 in Fig. 11; 162, in Fig. 12; and 166 in Fig. 16. As in the case of these baffles, the baffle 169 has a rim at 179 which is spaced closely from the tapering portion 479 of a conical extension fastened to the separating chamber wall to provide an annular opening at 219 through which the separated material may pass into the dead air space 139 therebeneath. It is only after segregation of the separated material from the convection current is completed by partition 169 that the convection current is caused to change its axial direction in the bottom of the semi-toroidal baffle 53 by passing beneath the lower end of sleeve 48 into the outlet 259.

For purposes of adjustment as well as convenience of mounting the attachment in a conventional separator, I support the hub 51 upon a screw 55 threaded into the hub portion 56 of a spider 57 lodged in the converging wall portions of the tapering lower end of the extension wall 479. The screw 55 has a squared end portion 58 adapted to receive a wrench by which it may be rotated to raise and lower the semi-toroidal baffle 53 and the extension sleeve 48 as a unit to increase and decrease the clearance between the baffle skirt 209 and the separator at the throat 219. It will be noted that the telescopic sleeve 48 is guided in the exhaust pipe portion 49 to guide the unitary assembly for axial movement in the separating chamber, its lower end being fixed co-axially of the chamber by the threaded engagement of screw 55 in hub 56 of spider 57.

The attachment comprising sleeve 48 with its unitarily connected spider 50, semi-toroidal baffle 53 and screw 55, and the spider 57 for the support of the screw, may be sold separately as a means of conveniently and almost instantaneously converting existing separators to use the principles of the present invention. For convenience of installation, the replacement cone 479 may also be included as part of the attachment to be substituted for the lower end of the original separator.

A similar attachment is shown in Fig. 14. It is even less expensive and has been proved to operate with great efficiency to achieve virtually complete separation. It is not the full equivalent of the device of Fig. 1 or that of Fig. 10, but it operates very well, even where the separated material comprises a substantially impalpable powder. As in the construction shown in Fig. 10, the hopper of the original separator is cut away to permit the introduction of the segregating baffle. The portion cut away may be replaced in the form of the sump 479 which, as in Fig. 10, is a substitute for the lower end of the original separating chamber.

The segregating baffle partition 177 comprises a disk which is only slightly smaller in diameter than the portion of the conical wall 479 within which it is mounted. From it depends the skirt 207 to form the annular crevice 217 of progressively decreasing cross section, through which segregated material passes to the sump. Thus, as in devices previously described, both the crevice and the flat annular surface adjacent the crevice are present.

A tube 557 may conveniently be used for the support of the baffle 177. The sleeve has a threaded portion 60 which is screwed into the hub 567 of the spider 577, whereby the rotation of tube 557 within the threaded hub will raise and lower the baffle 177 for adjustment.

Lock nuts may be used at 61 and 62 to secure the tube in adjustment.

In order to center the baffle 177 in the conical wall 479, so that the annular segregating crevice 217 may desirably have approximately uniform cross section all the way around the baffle, I may use a series of set screws at 63 which are mounted in the conical wall 479 and which bear upon an annular flange 64 welded to the underside of the baffle concentrically with tube 557. The axial length of the flange 64 is sufficient to provide a bearing against which the set screws may act throughout the practical range of vertical adjustment of the baffle.

As the convection current descends within the separating chamber 10, centrifugal force will maintain the separated material in contact with the wall of the chamber until such material passes into the annular discharge crevice or port 217. However, as the convection current approaches the partition baffle 177, it will necessarily flow inwardly over the surface of the partition baffle until it encounters the central cone 64 supported by the baffle, whereupon the convection current will pass upwardly in an axial direction which is the reverse of the original axial direction of approach to the baffle. As it turns, it is received within the sleeve 487, which constitutes a telescopic extension of the outlet pipe 259. In practice, I have had the best results when the outlet extension sleeve 487 has its receiving end at a level slightly below the apex of cone 64.

The sleeve may be supported in this position by a rod 67 which is provided at its upper end with a spider 66 attached to the sleeve. The rod passes downwardly through a guide bushing 67 at the apex of cone 64 and thence passes through the baffle partition 177 and tube 557 to project at 68 from the lower end of such tube. A cross pin 69 passing through the wall of the tube and through a series of openings in the rod provides for the adjustable support of the extension sleeve 487. The pin 69 is accessible through a door provided at 70 in the wall of the sump housing 479.

In all of the devices herein disclosed, I have found it desirable that the outlet provided for the convection current should be approximately three times as great in cross section as the inlet to the separator. As the convection current moves toward the separator, it substantially fills the entire cross section of the inlet pipe. However, as soon as whirling movement of the convection current is initiated, the weight of the constituents of such current causes the material of the convection current, as well as the conveyed material, to hug the outer wall through which it passes. Accordingly, the density of the gases of the convection current is much greater adjacent the wall of the outlet than it is at the center. Since most of the current flows helically around the pipe wall and the center of the outlet pipe is, to all intents and purposes substantially not used, the overall cross section must be greater to handle the whirling current than would be required if the flow were rectified.

This has an important bearing on the scale of the parts shown. For example, in the device of Fig. 14, the diameter of the baffle partition 177 is determined by the fact that it should nearly fill the cross section of the tapered conical wall 479 at the point at which it is located. Its location, in turn, should be such that when the sleeve 487 is disposed in the prescribed relationship, the total cross sectional area of the sleeve and the passage into it should be approximately three times the cross sectional area of the inlet 119. If the cross section of the outlet is excessively larger or smaller than this relative dimension based on the cross section of the inlet, the separation will not be as good. Even if the outlet pipe is three times as great in cross section as the inlet pipe, the device would still fail to operate at maximum efficiency if the clearance between the pipe and the partition baffle were inadequate to provide the same three to one ratio in cross section. Constrictions at any point should be avoided. The desired three to one relationship has been found to be effective regardless of whether the pressure differential which establishes the convection current is the result of blowing the material into the inlet pipe 119, or whether it is the result of using a blower to withdraw the material of the current from the outlet pipe 259.

Any desired number of separators as herein disclosed may be used in tandem.

In all of the devices herein disclosed, there is no reversal of the axial direction of convection current at the point where the centrifugally separated convected material is segregated from the current. In all of the devices herein disclosed, the convected material which passes through the annular throat in passing the segregating baffle is immediately received into a dead air space and is completely and permanently segregated by the baffle from any further exposure to the convection current. It is, therefore, immaterial what disposition is made of the convection current thereafter. It may pass axially from the apparatus, as in Figs. 5 and 8, or it may be let out laterally as in Fig. 1, or it may be turned upon itself to pass out axially in the opposite direction as in Figs. 10 and 14.

Regardless of which apparatus is used, the method of separation involves, in each instance, the establishment of a vortex in which the relatively heavier material, whether it be the material of the current or whether it be the convected material, is forced centrifugally to the outside of the whirling mass. Then, while the mass continues to whirl and to advance axially, with all portions of the mass advancing in the same axial direction, that material which is on the outside is segregated from the material on the inside by passage through an annular throat beyond which a partition baffle intervenes between the respective components. There is no change in axial direction of either component of the whirling mass until after separation and segregation are achieved. Only thereafter, if at all, is either component caused to change its direction of advance.

I claim:

1. In a centrifugal separator having a wall of circular cross section and means for establishing an axially and rotatively advancing vortex within said wall comprising a convection current and material to be centrifugally separated therefrom, a baffle in the path of advance of said vortex comprising a radial plate having a substantially flat portion substantially normal to the axis of said wall and nearly filling the space within the wall and having a face exposed to the advancing vortex and a substantially unobstructed margin spaced from said wall by an amount of the general order of three-eighths of an inch and a skirt extending from said margin convergently from said plate toward the wall in the direction of vortex advance and defining with said wall a narrow annular slot substantially unobstructed for the passage of centrifugally separated material, the means for establishing a vortex comprising a pipe opening tangentially into said chamber, said chamber having a return duct leading from the chamber portion beyond said baffle, and having an aspirating terminal portion in said pipe for inducing a return flow of gas through said duct.

2. The device of claim 1 in further combination with means for controlling flow through said duct.

3. A separator comprising the combination with a separating chamber having a wall of circular cross section, and tangential inlet means for introducing into said chamber a fluid convection current having entrained material heavier than the fluid of said current to be separated centrifugally from said fluid and for effecting rapid vortex rotation and axial advance of said current and entrained material in said chamber, whereby to throw the heavy entrained material to said wall where it is concentrated in a radially thin annular fluid component of said current and separated from a major fluid component of said current; of means for segregating the separated material from said major fluid component and precluding re-entrainment by accompanying vortex action, said segregating means comprising a radial baffle disposed at an end of the separating chamber where the said centrifugally separated components of the current continue in rapid vortex rotation and free of eddy currents, said baffle having an outer margin spaced from the wall at a radius approximating six-sevenths that of the chamber wall and having an annular flange extending from said margin convergently toward the wall to form with said wall an unobstructed annular crevice of wedge shaped cross section and with minimum radial clearance from said wall no more than approximately half that of said baffle margin, said crevice being adapted to pass the thin annular component of said current in which the heavy entrained material is concentrated, means beyond the baffle to receive the entrained material, and means for withdrawing centrally from the baffled end of the separating chamber the said major fluid component of said current.

4. The device of claim 3 in which the withdrawing means for the major fluid component comprises an axial duct having a cross section approximately three times that of the inlet.

5. The device of claim 3 in which the means for withdrawing the major fluid component of said current comprises a pipe which extends through the baffle.

6. The device of claim 3 in which the means for withdrawing the major fluid component of said current comprises a pipe which extends through said chamber away from the baffle and reversely to the direction of the said axial advance of the vortex current in said chamber.

References Cited in the file of this patent

UNITED STATES PATENTS

| Number | Name | Date |
|---|---|---|
| 404,217 | Morse | May 28, 1889 |
| 424,157 | Woodbury et al. | Mar. 25, 1890 |
| 515,259 | Skinner | Feb. 20, 1894 |
| 771,691 | Allington | Oct. 4, 1904 |
| 772,689 | Allington | Oct. 18, 1904 |
| 1,107,784 | Gray | Aug. 18, 1914 |
| 1,756,960 | Stebbins | May 6, 1930 |
| 1,818,905 | McGee | Aug. 11, 1931 |
| 1,888,372 | Bramwell | Nov. 22, 1932 |
| 1,960,887 | Alexander | May 29, 1934 |
| 2,039,115 | Reif | Apr. 28, 1936 |
| 2,153,026 | Ringius | Apr. 4, 1939 |
| 2,289,191 | Hall | July 7, 1942 |
| 2,329,299 | Rourke | Sept. 14, 1943 |
| 2,351,864 | Linderman | June 20, 1944 |
| 2,361,940 | Hall | Nov. 7, 1944 |
| 2,460,546 | Stephanoff | Feb. 1, 1949 |
| 2,569,710 | Fitzpatrick | Sept. 2, 1951 |
| 2,634,808 | Arnold | Apr. 14, 1953 |
| 2,692,026 | Frantz | Oct. 19, 1954 |
| 2,706,045 | Large | Apr. 12, 1955 |

FOREIGN PATENTS

| Number | Country | Date |
|---|---|---|
| 317,166 | Great Britain | Aug. 15, 1929 |
| 336,620 | Great Britain | Oct. 17, 1930 |
| 508,398 | Belgium | Jan. 31, 1952 |